US006928054B1

(12) United States Patent
Montuno et al.

(10) Patent No.: US 6,928,054 B1
(45) Date of Patent: Aug. 9, 2005

(54) APPARATUS, METHOD, MEDIA AND SIGNALS FOR CONNECTION-CLASS PARAMETER CONTROL OF PACKET FLOW

(75) Inventors: Delfin Y. Montuno, Kanata (CA); James Aweya, Nepean (CA); Michel Ouellette, Rockland (CA)

(73) Assignee: Nortel Networks Limited, St. Laurent ( * ) Notice: Subject to any disclaimer, the term of this patent is extended or adjusted under 35 U.S.C. 154(b) by 987 days.

(21) Appl. No.: 09/665,994

(22) Filed: Sep. 20, 2000

(51) Int. Cl.[7] .............................................. H04L 12/26
(52) U.S. Cl. ...................... 370/235; 370/238; 709/235
(58) Field of Search ................................. 370/229, 230, 370/235, 236, 238, 249, 250, 252, 352, 368, 401, 403, 442, 462, 522, 230.1, 232, 233, 334, 395.21, 395.43; 701/118; 709/200, 205, 219, 231, 235, 246, 251

(56) References Cited

U.S. PATENT DOCUMENTS

| | | | | |
|---|---|---|---|---|
| 4,769,815 | A | * | 9/1988 | Hinch et al. ................ 370/236 |
| 6,108,307 | A | * | 8/2000 | McConnell et al. ......... 370/235 |
| 6,119,235 | A | * | 9/2000 | Vaid et al. ................... 713/201 |
| 6,490,251 | B2 | * | 12/2002 | Yin et al. .................. 370/236.1 |

OTHER PUBLICATIONS

Jacobson, Van; Karels, Michael J.; "Congestion Avoidance and Control"; pp. 1–21; SIGCOMM, Nov. 1988.

Stevens, W.; Re: RFC 2001; "TCP Slow Start, Congestion Avoidance, Fast Retransmit, and Fast Recovery Algorithms"; pp. 1–6; Network Working Group, Jan. 1997.

McKenney, Paul E.; "High–Speed Event Counting and Classification Using a Dictionary Hash Technique"; pp. III–71–III–75; International Conference on Parallel Processing, 1989.

Carter, Larry; Floyd, Robert; Gill, John; Markowsky, George; Wegman, Mark; "Exact and Approximate Membership Testers"; pp. 59–65; National Science Foundation and Joint Services Electronics Program.

Jain, Raj; "A Comparison of Hashing Schemes for Address Lookup in Computer Networks"; pp. 1–17; Digital Equipment Corporation, Feb. 1989.

Ramakrishna, M.V.; Fu, E.; Bahcekapili, E.; "Efficient Hardware Hashing Functions for High Performance Computers"; pp. 1378–1381; IEEE Transactions on Computers, vol. 46, No. 12, Dec. 1997.

Rijsinghani, A.; re: RFC 1624; "Computation of the Inernet Checksum via Incremental Update"; pp. 1–6; Network Working Group, May 1994.

* cited by examiner

Primary Examiner—Wellington Chin
Assistant Examiner—John Shew (57) ABSTRACT

An apparatus, method, computer-readable medium and signals for connection-class parameter control of packet flow, involves indicating a desired packet flow from a packet source to a network element having a queue, by communicating to the packet source an indication of a desired number of packets to be received from the source in a time period, in response to a class parameter associated with a class of connections supported by the network element and queue conditions at the network element.

37 Claims, 8 Drawing Sheets

APPARATUS, METHOD, MEDIA AND SIGNALS FOR CONNECTION-CLASS PARAMETER CONTROL OF PACKET FLOW

FIELD OF THE INVENTION

This invention relates to apparatus, method, media and signals for connection-class parameter control of packet flow, which permit packet flows to be adjusted according to parameters related to the class of connection on which packets are transmitted.

BACKGROUND OF THE INVENTION

Most networks are built on a best-effort model where network elements treat all packets as independent and equal and are serviced on a first-in-first-out (FIFO) basis. The best-effort model does not provide any form of traffic isolation inside the network and network resources are completely shared by all users. As a result, some network users may try to use as many network resources as possible. A network operating in this way can become unstable and can suffer congestion collapse.

To avoid congestion collapse most data sources use TCP congestion control mechanisms which cause them to reduce packet sending rate when congestion occurs. When a resource within the network becomes overloaded, one or more packets are lost and the loss of a packet is taken as an indication of congestion. The destination informs the source of this congestion, and the source slows down. The source then gradually increases its sending rate until it again receives an indication of congestion. This cycle of increasing and decreasing the sending rate serves to probe and utilize whatever bandwidth is available, and to share it between different packet flows.

Effectively, data sources cooperate with the network element to share available bandwidth. However, such dependence on the cooperation of the sources is becoming increasingly unrealistic. Inevitably, some users start to exploit the weakness of the best-effort model to gain more resources. For example, web browsers sometimes establish multiple TCP connections to gain a greater share of the bandwidth of a network element.

The best-effort model also prevents networks from meeting the different needs of users since it is difficult to allocate more resources to those who are willing to pay more. These observations have motivated work on various mechanisms that might be implemented within the network itself to restrict the bandwidth of flows and to discriminate between services that are provided to different users.

Thus, it has been recognized that the needs of users of a data network are not the same and that current networks which provide the same service to all users are not optimal. Traditionally, many networks aim to provide a small number of service classes (typically two or three) with defined quality and prices. This is usually implemented by using multiple queues (one per class) in most elements of the network. In some cases the price being paid for a given service normally does not depend on the congestion state of the network, rather, network services are normally fixed for a given price. The network service provider usually has to make sure that there is always enough bandwidth capacity available to provide the agreed upon level of service. Per-class traffic scheduling can facilitate allocating bandwidth fairly among backlogged traffic classes and can provide low queuing delays. However, for TCP, fair bandwidth allocation through scheduling does not necessarily result in fair bandwidth usage in a class.

Thus, there is a need to provide for allocation of available bandwidth based on parameters associated with the different classes of data packets.

SUMMARY OF THE INVENTION

The present invention addresses the above needs by providing apparatus, method, computer-readable medium and signals for connection-class parameter control of packet flow, involving indicating a desired packet flow from a packet source to a network element having a queue, by communicating to the packet source an indication of a desired number of packets to be received from the source in a time period, in response to a class parameter associated with a class of connections supported by the network element and queue conditions at the network element.

The network element queue and its assigned network or service capacity imposes a physical limit on the resources of: the network element. This physical limit is effectively the maximum number of packets that can be in transit to their respective destinations, in other words, the "queue capacity". Through use of this invention queue capacity can be represented by a total effective window value which can be apportioned among connections according to a parameter value. For example, if the parameter value represents the price of connections belonging to a class of connections, the available queue capacity can be allocated among connections according to their price. In other words, higher priced connections can use more of the available queue capacity, compared to lower priced connections.

In accordance with one aspect of the invention, there is provided a method of indicating desired packet flow to a network element having a queue. The method comprises communicating to at least one packet source an indication of a desired number of packets to be received from the packet source in a time period, in response to a class parameter associated with a class of connections supported by the network element and queue conditions at the network element.

In one embodiment, a measure of queue conditions is produced. Queue conditions may be represented by a total effective window value that can be shared among all connections. This total effective window value may be determined by taking the product of a value W representing an effective window size per connection for a typical connection, and an entity $$\sum_{j=1}^{K} N_j$$

representing the total number of connections in all the classes of connections at the network element. The product representing the total effective window value may therefore be represented as follows:

$$W \cdot \sum_{j=1}^{K} N_j$$

In one embodiment, the total effective window value is apportioned among different classes of connections. Preferably, the total effective window value may be apportioned among different classes of connections according to class parameters. In one embodiment a class parameter may be a price value associated with a particular class of connection and apportioning may occur by weighting according to relative prices of the classes of connections. In one embodiment, weights may be price ratios representing the ratio of one of the prices associated with a corresponding class of connections to the sum of all such prices, to produce apportioned window values according to class parameters.

In one embodiment, the apportioned window values may further be apportioned according to the number of connections in the corresponding class to produce a class connection-specific window size value $W_i$.

This class connection-specific window size value $W_i$ represents a desired packet volume which may be transmitted to a source in an acknowledgement packet in response to the source transmitting a forward data packet in class i. Thus, to indicate a desired packet flow, a desired packet volume associated with the associated class of connection may be communicated to the packet source. Generally, the class connection-specific window size value may be thought of as a class connection-specific volume value representing the number of packets which can be transmitted by the packet source to the queue. A plurality of class connection-specific volume values may be calculated and transmitted to sources which have established connections belonging to different classes of connections.

For example, class connection-specific window size values $W_i$ may be calculated according to the relation:

$$W_i = \frac{\gamma_i \cdot W \cdot \sum_{j=1}^{K} N_j}{\text{Max}(N_i, 1)}$$

Where:

W is an effective window size value representing current queue conditions $$\sum_{j=1}^{K} N_j$$

is the total number of connections in all classes $N_i$ is the number of connections in class i and max($N_i$,1) avoids a divide by zero condition if $N_i$ is 0

$\gamma_i$ is a price ratio of the price associated with class i to the sum of the prices of each class:

$$\gamma_i = p_i \bigg/ \sum_{j=1}^{K} p_j, \quad i = 1, 2, \ldots, K;$$

where $p_i$ is the price value associated with class i; and

K is the total number of classes.

Using the above relation, communicating to the packet sources involves transmitting the class connection-specific window size values to respective transmitters. In one embodiment, price values associated with respective classes may be received and stored as class parameters at the network element.

According to another aspect of the invention, there is provided an apparatus for indicating desired packet flow from a packet source to a network element having a queue. The apparatus comprises a processor circuit operable to produce a desired packet flow representation in response to a class parameter associated with a class of connections supported by the network element and queue conditions at the network element. The apparatus further comprises a desired packet flow representation signal transmitter for transmitting the desired packet flow representation to the packet source.

According to another aspect of the invention, there is provided an apparatus for indicating desired packet flow to a network element having a queue. The apparatus comprises provisions for setting a class parameter associated with a class of connections supported by the network element, provisions for measuring queue conditions, and provisions for communicating to at least one packet source an indication of a desired number of packets to be received from the at least one packet source in a time period, in response to class parameters associated with a class of connections supported by the network element and queue conditions at the network element.

According to another aspect of the invention there is provided a computer-readable medium for providing instructions for directing a processor circuit to communicate to at least one packet source an indication of a desired number of packets to be received from the at least one packet source in a time period, in response to a class parameter associated with a class of connections supported by a network element and queue conditions at the network element.

According to another aspect of the invention there is provided a signal embodied in a carrier wave, the signal comprising a first code segment for directing a processor circuit to communicate to at least one packet source an indication of a desired number of packets to be received from the at least one packet source in a time period, in response to a class parameter associated with a class of connections supported by a network element and queue conditions at the network element.

It will be appreciated that the invention facilitates the use of a class parameter to allocate resources at a network element, according to the available queue capacity, and more particularly facilitates allocating available queue capacity to different classes of connections based on associated class parameters.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
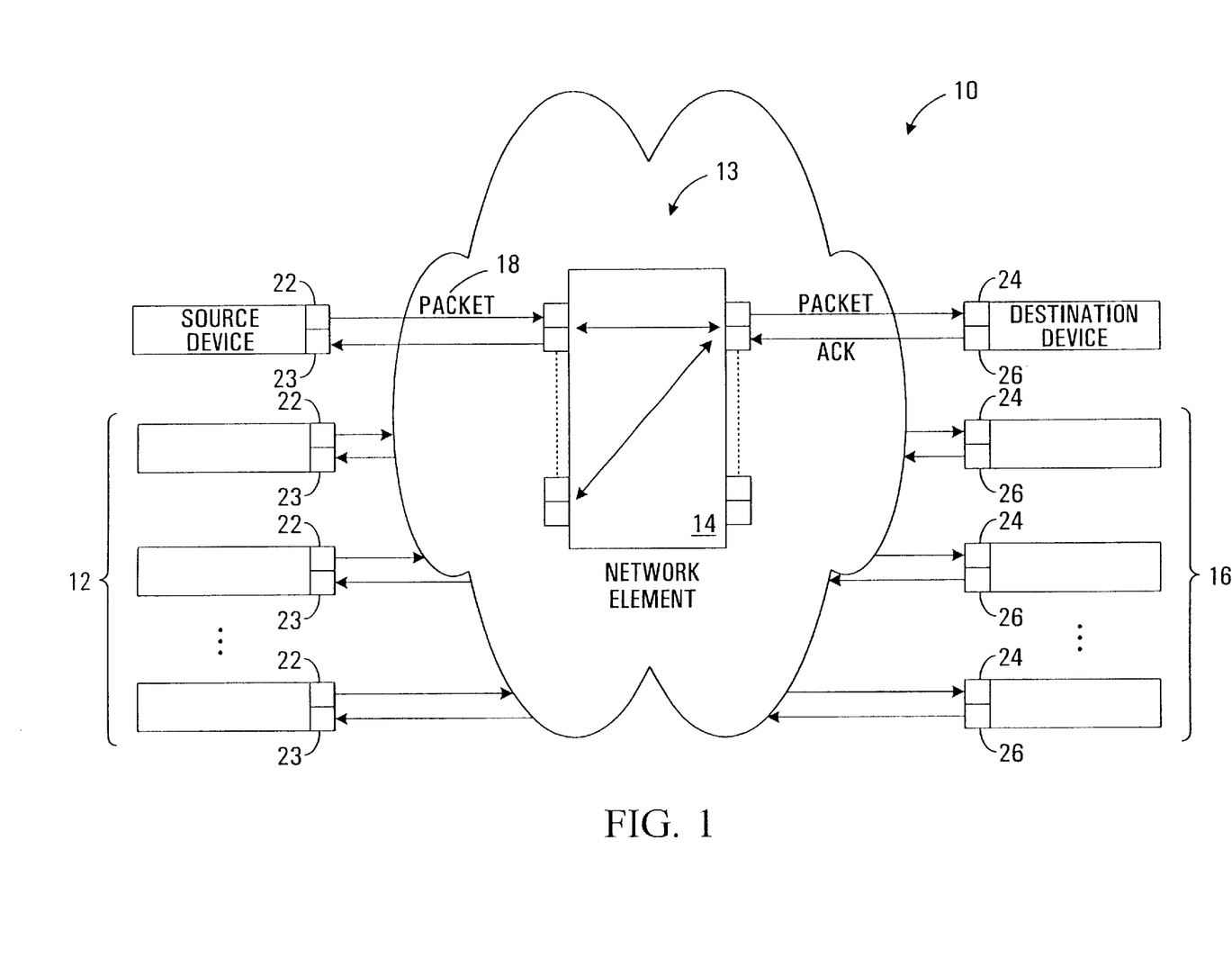
FIG. 1 is a block diagram of a network, including an intermediate network element, according to a first embodiment of the invention.

As shown generally at 10 in FIG. 1, a network according to a first embodiment of the invention includes a first plurality of data packet sources 12, a network element 14 and a first plurality: of data destinations 16. In general, the sources 12 transmit data in a forward direction to the network element 14 which, in turn, transmits the data to appropriate destinations 16. It will be appreciated that there may be a plurality of network elements between the plurality of sources and the plurality of destinations.

In this embodiment, the data transmitted by the packet sources 12 is transmitted as "forward" packets 18 which are communicated in a forward direction i.e. from the packet sources to the destinations 16. In this specification, the term "packet" is applied broadly, and contemplates any quantum of data, such as a block, a frame, a datagram, a cell, a word, a byte, or a bit, for example. In general, a source/destination pair that exchanges packets via one or more network elements 14 is called a connection.

The first plurality of packet sources 12 may include any device capable of transmitting data on a network, for example a telephone, a computer, a terminal, a video camera, an appliance with embedded logic or processor circuitry, or more generally any telecommunication or telephony device. Additionally, any, some or all of the packet sources 12 may include a receiver 23 for receiving data from the network 10.

The plurality of destinations 16 may include any devices capable of receiving data on a network, for example a telephone, a computer, a terminal, a video receiver, an appliance with embedded logic or processor circuitry, or more generally any telecommunication or telephony device.

Each of the destinations 16 includes a receive buffer 24 for receiving packets 18 for use at the destinations 16. Additionally, each destination 16 has a transmitter 26 for transmitting data on the network 10.

When a destination 16 receives a forward packet 18, it engages its transmitter to transmit an acknowledgement signal in the form of an acknowledgement packet, in a reverse direction for receipt by the corresponding source 12 via the network element 14 associated with the connection. Generally, an acknowledgement signal is a special reverse data packet transmitted in the reverse direction, i.e. from the destination 16 to the source 12, and includes a specific pattern of bits that identifies it as an acknowledgement signal. This specific pattern of bits includes source and destination addresses, port identifiers, and a representation of a maximum reception volume. The source and destination addresses identify a source device and a destination device respectively. The port identifiers identify applications. The set of all reverse data packets, or packets with a common source address, destination address and port address is referred to as a "session".

The representation of the maximum reception volume represents the maximum volume of data the destination 16 can receive in a time interval. This maximum volume is referred to as an advertised window of the receiver Wrec, or receiver volume value. Thus, an acknowledgement signal communicates the advertised window, or receiver volume value, of the destination 16 to the packet source 12.

Each packet source 12 includes a transmission buffer 22 for queuing forward data packets 18 prior to transmission. The volume or number of forward data packets 18 which are transmitted from the transmission buffer 22 at a given time is determined by a sliding window called a "congestion window" maintained by a processor at the packet source and operating on the transmission buffer 22. Each time a transmitted forward data packet 18 is acknowledged by a destination 16, the congestion window advances, permitting the packet source 12 to transmit a new forward data packet 18 onto the network 10. The size of the congestion window determines the volume of forward data packets 18 transmitted from the packet source 12.

Each packet source 12 is programmed to determine the lesser of its congestion window and the size of the advertised window of the corresponding destination 16, and to use this lesser value as a measure of the number of packets to be dispatched toward the destination. If the packet source receives an acknowledgement signal directly from the destination 16, the destination 16 can cause the packet source 12 to increase or decrease its transmission volume according to the capability of the destination 16 to receive data.

Figure 2:
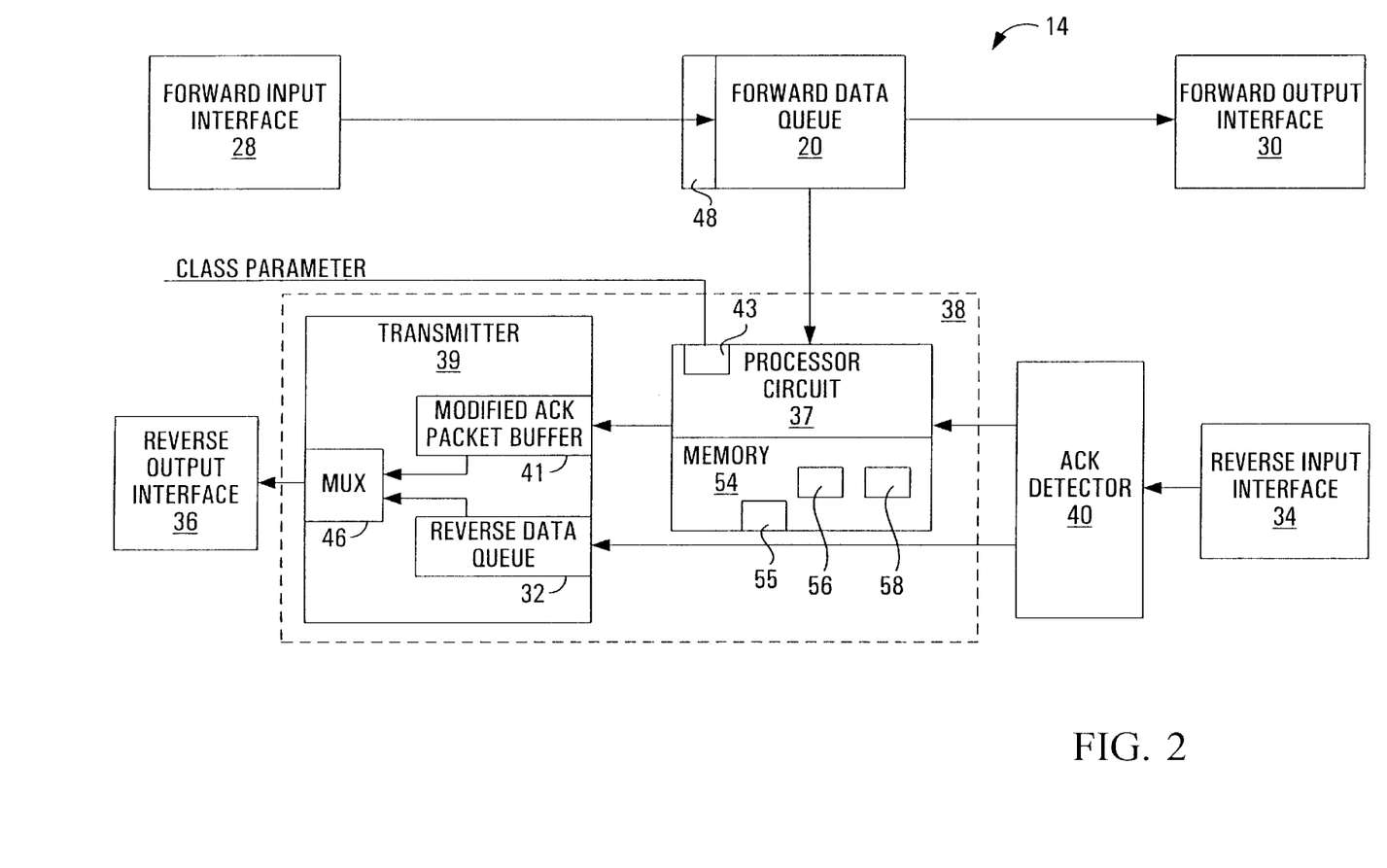
FIG. 2 is a block diagram of the network element shown in FIG. 1.

Referring to FIG. 2, the network element 14 according to the first embodiment of the invention is shown in greater detail and includes an apparatus 38 for indicating desired packet flow from the packet source 12 to the network element 14 in response to a packet class parameter associated with a class of connections supported by the network element 14 and a measure of queue conditions at the network element 14. To do this, the apparatus 38 includes a processor circuit 37 operable to produce a desired packet flow representation in response to the class parameter and queue conditions at the network node, and a desired packet flow representation signal transmitter 39 for transmitting an indication of desired packet flow or packet volume associated with a class of connections to the packet source 12 shown in FIG. 1.

In this embodiment, the network element 14 includes a detector 40 for detecting an acknowledgement signal produced by the destination 16 in response to receipt of a forward data packet from the packet source 12 shown in FIG. 1.

In this embodiment, the detector 40 cooperates with the apparatus 38 to effectively intercept acknowledgement signals produced by the destinations 16 shown in FIG. 1 and replace the advertised window size in the acknowledgement signals with new representations of desired packet flow for the corresponding class of connections. The transmitter 39 then transmits new acknowledgement signals, with the new representations of desired packet flow, to the corresponding packet sources 12 shown in FIG. 1. The packet sources 12 respond as though the new acknowledgement signals were transmitted directly from corresponding destinations 16, and adjust the sizes of their respective congestion windows accordingly.

Referring back to FIG. 1, in the above manner, the transmission volume of each class of connections provided by the packet sources 12 is adjusted according to queue conditions and packet class parameters. Packet class parameters may include prices associated with respective classes of data packets, for example. This eases congestion at the network element 14 on the basis of class of connection, thereby improving network performance. Thus, changing network conditions as detected by the queue of the network element 14 and packet class parameters play a: role in changing the desired volume of received packets in particular classes and therefore the actual transmission volume of packets in particular classes is adjusted to take into account the changing capacity of the entire network connection from the packet source 12 to the destination 16, and packet class parameters, including price, for example.

A network element 14, in which the above apparatus may be incorporated could be any device connected to the network 10 to receive forward data packets 18 from a packet source 12 to be forwarded to a destination 16 and to receive acknowledgement signals from the destination 16 to be forwarded to the packet source 12. In this embodiment, the network element 14 is a store- and forward device, such as a router, switch, or gateway, for example.

Referring to FIG. 2, in this embodiment the network element 14 includes a forward input interface 28 in communication with a communications medium such as a data line, on which the packet sources 12 of FIG. 1 transmit forward data packets. The forward input interface 28 provides data packets to a queue interface 48 which administers packets into a queue 20 and which provides information to the apparatus 38 about queue conditions, or more particularly, the status of the queue 20. Such information could include the total queue size Q, the queue occupancy q, the packet arrival volume $\hat{M}$, the target packet departure volume T, the actual service volume C, the target utilization factor $\rho$, the upper threshold Th, and/or the allocated buffer size B, for example.

The total queue size Q is the total storage space available in the queue 20 for storing packets 18 from all of the packet sources 12. The queue occupancy q is the number of packets 18 that are currently stored in the queue 20, and may be expressed as a number of packets 18, an amount of memory, or a ratio of the total queue size Q. The packet arrival volume $\hat{M}$ represents the number of packets 18 admitted to the queue 20 during a current sampling/control interval $\Delta t$. The target packet departure volume T is the target number of packets 18 that can be dispatched from the queue 20 during the current sampling/control interval $\Delta t$. The actual service volume C represents the maximum number of packets 18 that can be dispatched from the queue 20 during a sampling/control interval $\Delta t$. The target utilization factor $\rho$ represents a desired ratio of the target packet departure volume T and the actual service volume C. The upper threshold Th represents a queue occupancy q above which it is desirable to adjust the arrival volume $\hat{M}$ or the target departure volume T to reduce the queue occupancy q. The allocated buffer size B is the size of an allocated buffer in the queue.

Data packets stored in the queue 20 are provided to a forward output interface 30 which is connected to a communications medium on which the network element 14 transmits forward data packets from the queue 20 to the destination 16.

Signals received from the destination 16, in particular, signals representing packets transmitted from the destination 16 to the packet source 12 are received from a communications medium by a reverse input interface 34. The reverse input interface 34 converts the received signals into bytes representing a reverse data packet and provides the reverse data packet to the detector 40.

Detector

Figure 3:
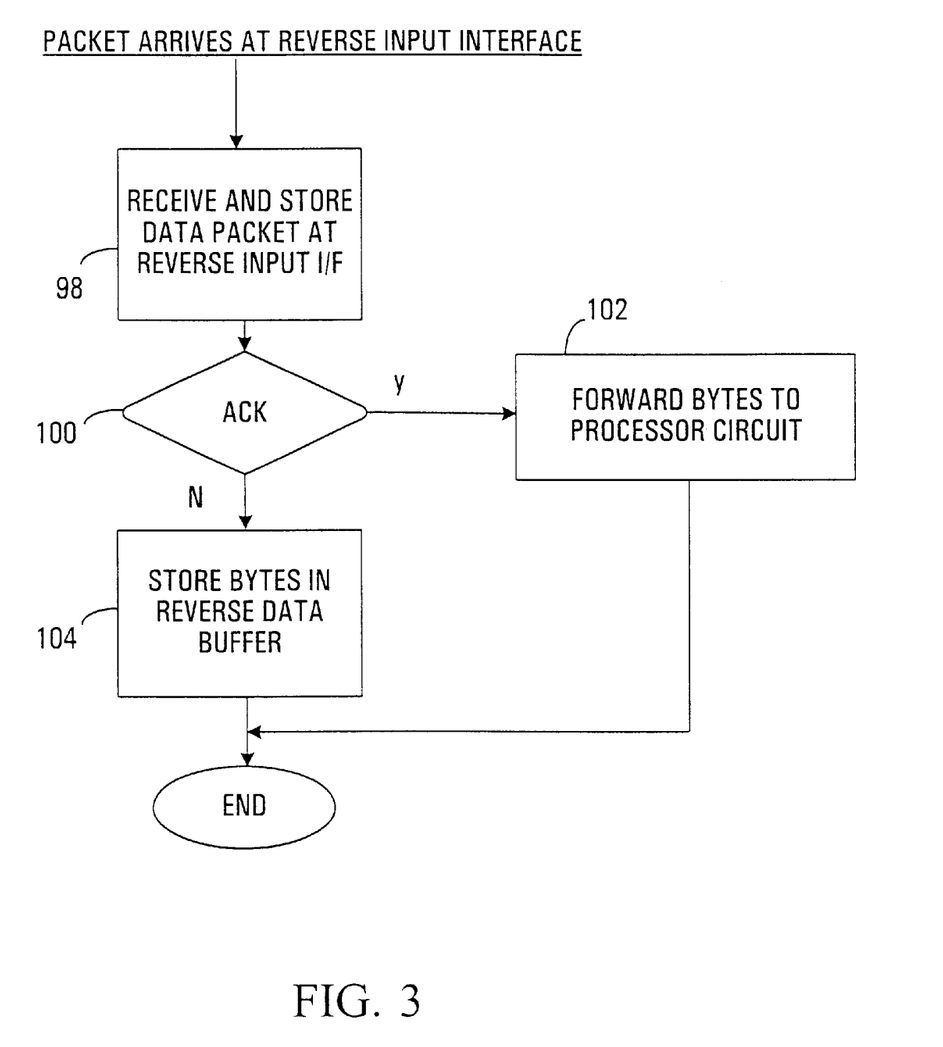
FIG. 3 is a flowchart representing an algorithm executed by a processor at a detector of the network element shown in FIG. 2.

The functionality of the detector 40 is explained with reference to FIGS. 2 and 3. The detector 40 receives the reverse data packet and stores it in a buffer, as indicated by block 98 in FIG. 3. The detector 40 then examines a type field of the reverse data packet to determine whether or not it is identified as an acknowledgement packet. If the reverse data packet is of the Transmission Control Protocol (TCP) type, the detector simply determines whether or not an "ACK" bit in the TCP packet header is set. Alternatively, acknowledgement information can be obtained from a specially encoded data packet. In any event, as indicated by block 100 in FIG. 3, the detector determines whether or not the reverse data packet represents an acknowledgement from the destination 16 shown in FIG. 1.

If the reverse data packet does not represent an acknowledgement, then, as indicated by block 104, it is sent directly to a reverse data queue 32 in the transmitter 39. Alternatively, as indicated by block 102, if the reverse data packet is identified as representing an acknowledgement, it is forwarded to the processor circuit 37 shown in FIG. 2.

Referring to FIG. 2, the processor circuit 37 modifies, when necessary, the acknowledgement packet to produce a modified acknowledgement packet encoded with a new advertised window to represent the desired volume of data to be transmitted from the corresponding packet source. The modified acknowledgement packet is received in a modified ack packet buffer 41 at the transmitter 39.

A multiplexer 46 at the transmitter receives signals representing a reverse data packet from the reverse data queue 32 and receives signals representing the modified acknowledgement packet in the modified ack packet buffer 41 and forwards them to a reverse output interface 36. The reverse output interface 36 is connected to a communications medium on which the packet source 12 shown in FIG. 1 is operable to receive data and thereby communicates either the reverse data packet or the modified acknowledgement packet to the packet source 12.

It will be appreciated that the detector 40 can be implemented by discrete components or by a design involving a programmable processor circuit operable to execute codes for directing the processor circuit to carry out the functionality described above, for example. The functional blocks shown in FIG. 3 may be implemented by such codes, for example. Such codes may be pre-stored in an instruction memory 55 at the network element and run by the processor circuit 37 at the network element. It will be appreciated that the processor circuit 37 may be in communication with an interface (not shown) permitting such codes to be downloaded from a remote computer and stored in instruction memory 55, or the processor circuit 37 may have a media interface (not shown) for reading codes from a computer readable medium such as a CD-ROM, diskette or any other computer readable medium.

Processor Circuit:

The function of the processor circuit 37 is described in connection with FIGS. 2 and 4. To produce the modified acknowledgement packet encoded with the new advertised window, the processor circuit extracts a receiver advertised window, or destination volume value, from an advertised window field Wrec of the acknowledgement packet as received from the destination 16 shown in FIG. 1. The terms receiver advertised window, Wrec, and destination volume are used interchangeably. In addition, the processor circuit produces a class connection-specific window size value $W_i$ and determines which of the class connection-specific window $W_i$ and the receiver advertised window Wrec is the lesser, subject to some minimum value. The lesser of these two values is encoded and stored in the advertised window field of the acknowledgement packet to replace the current contents thereof. A modified acknowledgement packet is thus produced and forwarded to the modified ack packet buffer 41 for transmission to the packet source 12.

It will be appreciated that the processor circuit 37 can be implemented by discrete components or by a design involving a programmable processor circuit operable to execute codes for directing the processor circuit to carry out the functionality described above, for example. Such a programmable processor circuit may be the same processor circuit as used for the detector 40 or may be a separate processor circuit. It will be appreciated that the processor circuit may be in communication with an interface 43 permitting such codes to be downloaded from a remote computer and stored in instruction memory 55, or the processor circuit may have a media interface for reading codes from a computer readable medium such as a CD-ROM, diskette or any other computer readable medium. In addition, the interface 43 or an additional interface (not shown) may be used to download or otherwise communicate to the processor circuit class parameter information, such as price.

Figure 4:
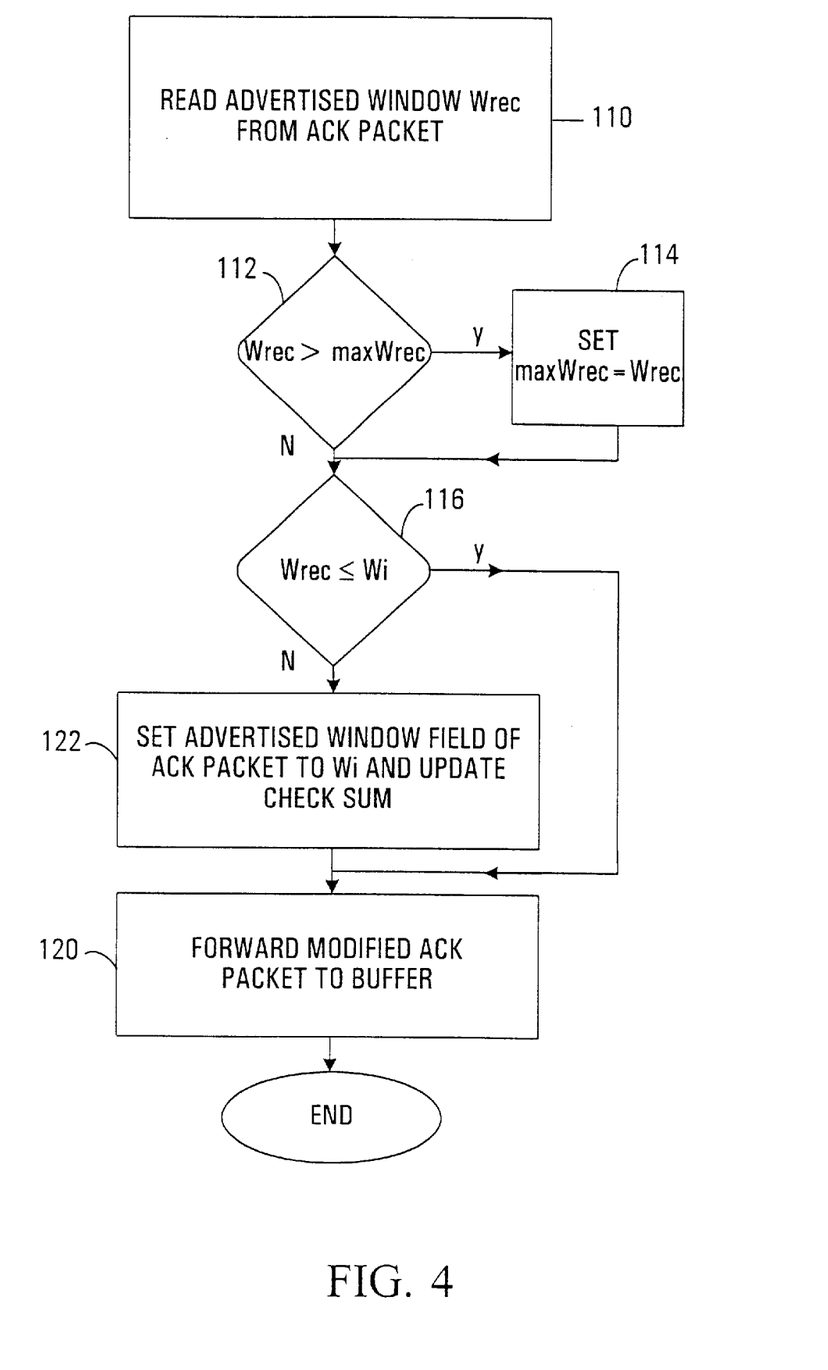
FIG. 4 is a flowchart representing a window setting algorithm executed by a processor circuit shown in FIG. 2.

Codes which direct the processor circuit 37 to carry out the functionality described above are represented by blocks in the flowchart shown in FIG. 4. In this flowchart, Block 110 directs the processor circuit 37 to extract an advertised window Wrec from the acknowledgement packet.

Block 112 directs the processor circuit 37 to determine whether the receiver advertised window Wrec is greater than a previously obtained maximum advertised window value maxWrec. If so, then block 114 directs the processor circuit to set the maximum receiver advertised window value maxWrec equal to the currently observed receiver advertised window Wrec. Over time this has the effect of finding and storing as the maxWrec value, the maximum observed receiver advertised window Wrec. Thereafter, block 114 directs the processor circuit to block 116.

Alternatively, if the receiver advertised window Wrec is not greater than the maximum receiver advertised window maxWrec, then the processor circuit 37 is directed to block 116, where it is directed to determine whether the receiver advertised window value Wrec is less than or equal to the current class connection-specific volume value $W_i$ for the class of connections with which the received ACK packet is associated. If so, then block 120 directs the processor circuit to forward the acknowledgement packet to the modified ack packet buffer 41 shown in FIG. 2, without modification, for transmission to the packet source 12 shown in FIG. 1.

Referring back to FIG. 4, alternatively, if the receiver advertised window Wrec of the receiver is not less than or equal to the current class connection-specific volume value $W_i$ of the network element, then the processor circuit 37 is directed by block 122 to modify the advertised window field of the acknowledgement packet to include a representation of the current class connection-specific volume value $W_i$ of the network element and to modify a checksum field of the acknowledgement packet accordingly, to produce a modified acknowledgement packet. Thereafter, block 120 directs the processor circuit to forward the modified acknowledgement packet to the modified ack packet buffer 41 for forwarding to the reverse output interface 36 for transmission to the packet source 12.

The class connection-specific volume value $W_i$ is calculated by the processor circuit 37 shown in FIG. 2 in response to conditions at the queue 20 through which the forward data packets pass from the packet source to the destination and in response to a class parameter associated with a class of connections supported by the network element. Effectively, the value $W_i$ is calculated according to the relation:

$$W_i = \frac{\gamma_i \cdot W \cdot \sum_{j=1}^{K} N_j}{\text{Max}(N_i, 1)}$$

Where:
W is an effective window size value representing current queue conditions $$\sum_{j=1}^{K} N_j$$

is the total number of connections in all classes
$N_i$ is the number of connections in class i and max($N_i$,1) avoids a divide by zero condition if $N_i$ is 0
$\gamma_i$ is a price ratio of the price associated with class i to the sum of the prices of each class:

$$\gamma_i = p_i \bigg/ \sum_{j=1}^{K} p_j, \quad i = 1, 2, \ldots, K;$$

where
$P_i$ is the price value associated with class i
K is the total number of classes.

Calculation of Effective Window Size (W)

In this embodiment the effective window size (W) represents a window size of a typical connection that minimizes the mismatch between the forward data arrival volume and the target or desired forward data departure volume of the queue, having regard to upper and lower bound departure volumes, the target utilization factor, the actual service volume, the queue occupancy and the allocated buffer size, for example. Ultimately, the effective window value W represents available queue capacity, or in other words, queue conditions at the network element.

To produce an effective window value W, the processor circuit 37 may be programmed by more codes. Such codes may be pre-stored at the network element 14 in instruction memory 55 and run by the processor circuit 37, for example.

Referring to FIG. 2, the codes run by the processor circuit implement an interval timer that periodically decrements from a value representing the sampling/control interval $\Delta t$. The expiration of the timer marks the beginning of a new time-interval n, whereupon the interval timer is reset to again begin decrementing the sampling/control-interval $\Delta t$.

Preferably the sampling/control interval $\Delta t$ is at least equal to the maximum possible round trip time (RTT). A suitable RTT for a Wide Area Network (WAN) is on the order of about 100 mSec.

Figure 5:
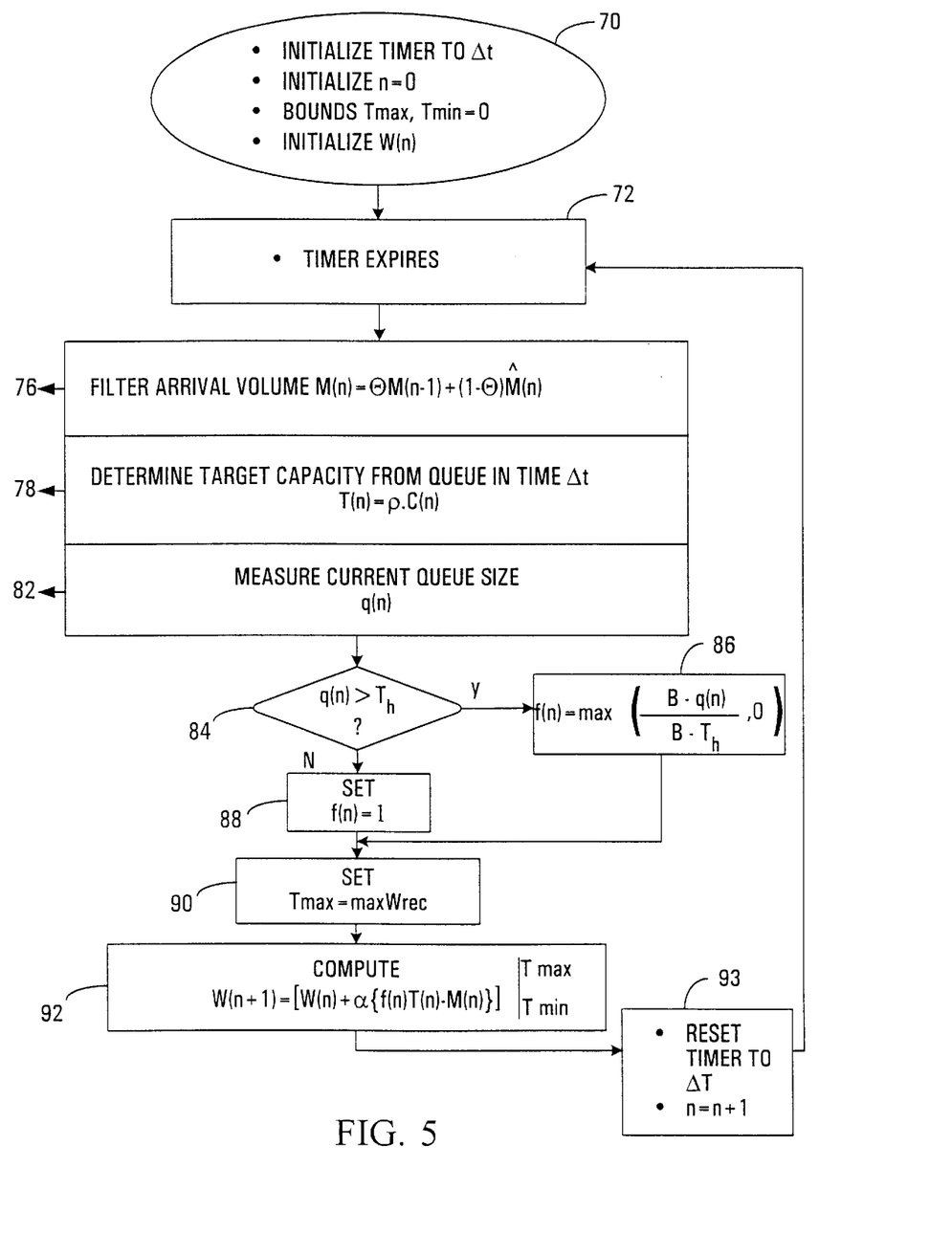
FIG. 5 is a flowchart of an effective window size computation algorithm executed by the processor circuit shown in FIG. 2.

Referring to FIG. 5, the calculation of the effective window value W is described by way of a flowchart of an algorithm executed by the processor circuit. The flowchart shown may be considered to represent blocks of codes for directing the processor circuit to produce the effective window value W.

Referring to FIGS. 2 and 5, at block 70, the process of computing an effective window value W begins with an initialization block to direct the processor circuit 37 to initialize the timer to the sampling/control-interval value $\Delta t$, to initialize a sample index n to 0, to initialize an upper and lower bound departure volumes T max, T min equal to 0, and to initialize the network element volume value W(n=0) to a suitable value such as a known bandwidth-delay product of a typical connection. In general, the computed effective window value will converge to an optimal value after a few iterations of the algorithm regardless of what initial effective window value is used.

The timer periodically decrements from the sampling/control-interval value Δt, and when it expires, block 72 is invoked, for example through an interrupt signal produced by the timer.

Block 76 directs the processor circuit 37 to act as a current arrival volume filter to obtain a new current arrival volume $\hat{M}(n)$ from the queue interface 48 and to time filter the current arrival volume $\hat{M}(n)$ as a weighted sum of present and past arrival volumes, in this embodiment according to the equation $M(n)=\Theta M(n-1)+(1-\Theta)\hat{M}(n)$, where $\Theta$ is a weighting constant between 0 and 1, pre-programmable by a user to produce a filtered current arrival volume. The use of the current arrival volume filter reduces the effect of sudden bursts of data such as those transmitted according to TCP, on the filtered arrival volume value.

Block 78 then directs the processor circuit 37 to act as a departure volume value generator by obtaining the target utilization factor ρ and the actual service volume C from the queue interface 48 and by producing a calculated current target departure volume T(n), as the product of the target utilization factor ρ (e.g. 95%), and the actual service volume C. The current target departure volume represents the target number of bytes that can be transmitted from the queue in a time interval Δt.

Blocks 82 to 88 direct the processor circuit 37 to act as a queue size control mechanism. Block 82 directs the processor circuit to obtain the current queue occupancy q(n) and the upper threshold $T_h$ from the queue interface 48 and block 84 directs the processor circuit to determine whether the current queue occupancy q(n) is greater than the upper threshold $T_h$.

If the current queue occupancy q(n) is greater than $T_h$, then block 86 directs the processor circuit 37 to obtain the allocated buffer size B from the queue interface 48 and to set a scaling factor f(n), in this embodiment, according to the equation $$f(n) = \max\left(\frac{B-q(n)}{B-T_h}, 0\right).$$

The processor circuit 37 is then directed to block 90. Alternatively, if at block 84 the current queue occupancy q(n) is less than or equal to the upper threshold $T_h$, then block 88 directs the processor circuit 37 to set the scaling factor f(n) equal to 1 and to proceed to block 90.

The algorithm may include block 90 which directs the processor circuit 37 to act as a volume limiter by setting the maximum departure volume T max equal to the maximum observed destination volume value maxWrec, where the maximum observed destination volume value is recorded by the processor circuit 37.

Block 92 then directs the processor circuit 37 to set a current effective window value W(n) equal to a function of the previous effective window value, plus the product of a control gain a and the difference between the product of the scaling factor f(n) and the calculated target departure volume T(n), less the arrival volume M(n), all bounded between the maximum departure volume T max and the minimum departure volume T min:

$$W(n+1) = [W(n) + a\{f(n)T(n) - M(n)\}]_{T\min}^{T\max}, 0 < \alpha < 1.$$

A minimum (positive) window is preferably T min=0 however a larger minimum window may alternatively be used.

Block 93 directs the processor circuit 37 to reset the interval timer with the sampling/control-interval value Δt and to increment the sample index n, i.e. n=n+1, causing an advance to the next sampling/control interval. Thus, the timer marks sampling/control intervals of duration Δt. The processor is then returned to block 72.

Referring back to FIG. 2, the calculated effective window value W is useable by the processor circuit 37 for use in calculating a class connection-specific volume value $W_i$ representing the number of packets which can be received into the queue from active connections of a corresponding class associated with the class connection-specific volume value.

To calculate the class connection-specific volume value $W_i$, the number of active connections in each class must also be calculated.

Calculation of Number of Active Connections in Each Class

It will be recalled that an acknowledgement signal includes an identification of source and destination addresses and port identifiers. The processor circuit 37 may be configured to extract source and destination addresses and port information from an acknowledgement packet to be used as connection information. Since a single connection may involve the transmission of many packets and acknowledgement signals, it is necessary to distinguish those packets and signals belonging to different connections. The connection information may be used to classify the connection and also used to count the number of active connections in each class.

To count active connections, referring to FIG. 2, the processor circuit includes a memory 54 which is configured to cooperate with a plurality of counters 56 corresponding to each class of connection, for counting the number of active connections in each class. The memory 54 is further configured to maintain a plurality of hash tables 58 for identifying distinct connections within each class.

Figure 6:
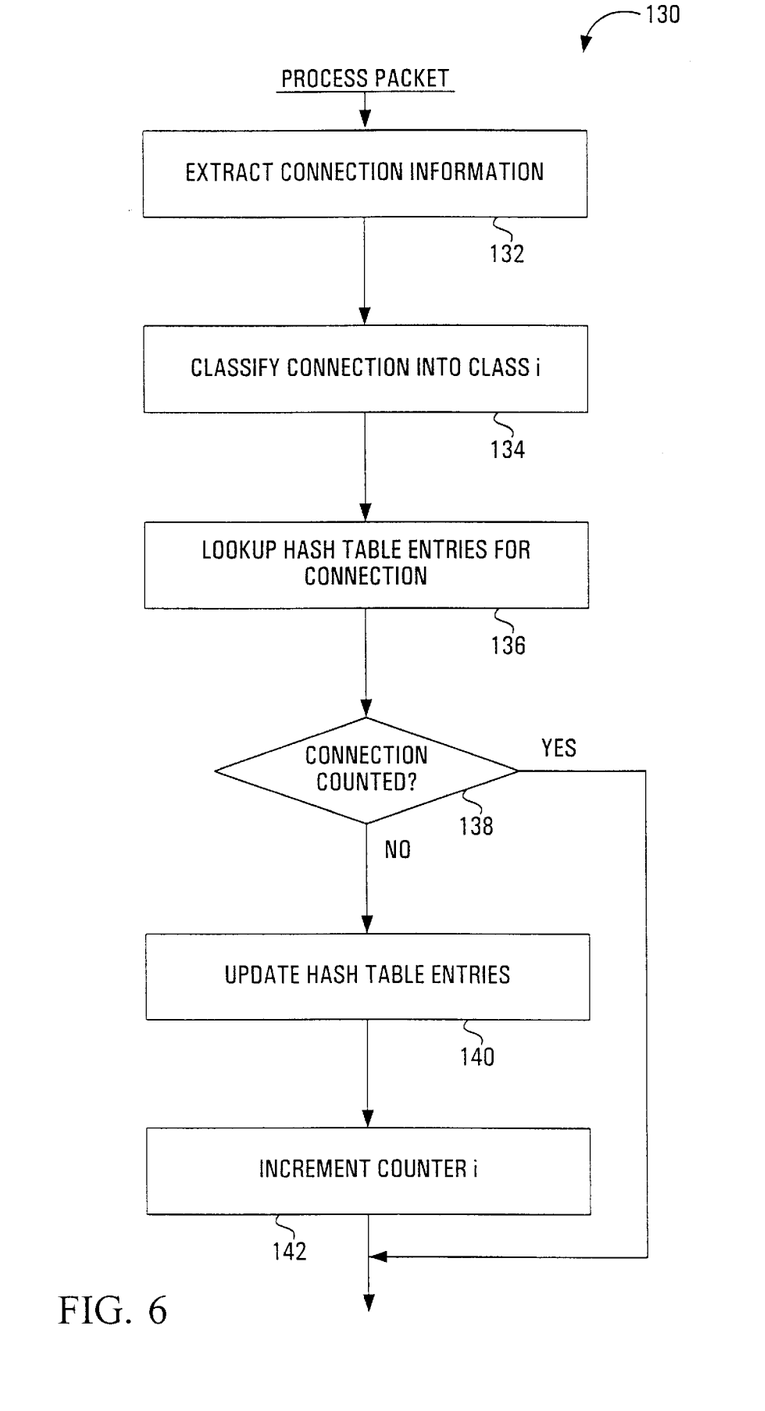
FIG. 6 is a flowchart of a packet processing algorithm executed by the processor circuit shown in FIG. 2.

Referring to FIG. 6, the processor circuit 37 processes each individual acknowledgement packet according to a process as shown generally at 130, to count the number of active connections in each class during a predefined measurement time period. Connection information is extracted from the individual packet at block 132, by accessing the bits of the packet corresponding to source and destination addresses and port identifiers. Then, at block 134, the connection information is used to classify the connection into one of the classes of connections. For example, the processor circuit 37 may maintain classification information in a pre-programmed classification table, (not shown) wherein the classification table lists a different class for different combinations of addresses and port identifiers. The classification table may indicate all connections with a particular port identifier belong to a certain class, or may indicate that addresses belonging to a certain network user belong to a certain class, for example. Classification of a connection is done by comparing the connection information to the classification information.

Following classification at block 134, the connection information is tested at block 136 to see if it is distinct. If the particular connection information has not been extracted from any other packet during the predefined measurement time period, then the corresponding connection will not have been counted and therefore should be identified as distinct, so that it may be counted. To determine whether or not a connection is distinct, the hash tables 58 are used.

Figure 7:
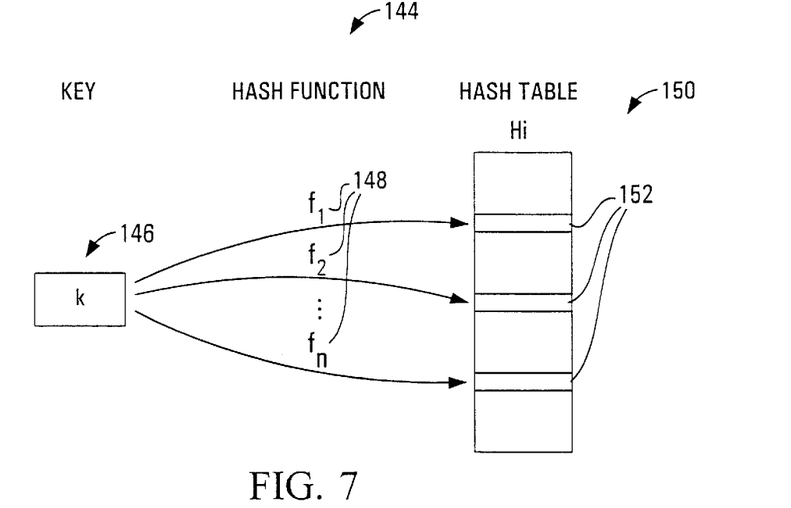
FIG. 7 is a schematic representation of the use of a hash table shown in FIG. 2.

Referring to FIGS. 2 and 7, the hash tables 58 stored in the memory 54, include, in a first embodiment, a hash table (Hi) 150 for the $i^{th}$ class of connections identified at block 134 of FIG. 6. The hash table Hi 150 comprises hash table entries 152 used to store an indication of whether connection information is distinct. The connection information obtained from an acknowledgement packet is used as a key value 146 for the hash table 150 to index a particular hash table entry 152. The association or indexing (also known as hashing) between the key 146 and the hash table entry 152 is provided by a hash function 148. It is known in the art to select a hash function 148 and hash table configuration so as to reduce the number of keys 146 hashing to the same hash table entry 152, thus reducing the possible errors in identifying connection information as distinct. In another embodiment, multiple hash functions 148 are applied to a single key 146 to index multiple hash table entries 152 as taught by P. E. McKenney in "High-Speed Event Counting and Classification using a Dictionary Hash Technique," *International Conference on Parallel Processing,* 1989, pp. III-71–75. Thus, the connection information is identified as distinct depending on the values located in multiple hash table entries 152, indexed by multiple hash functions 148 applied to the connection information.

Figure 8:
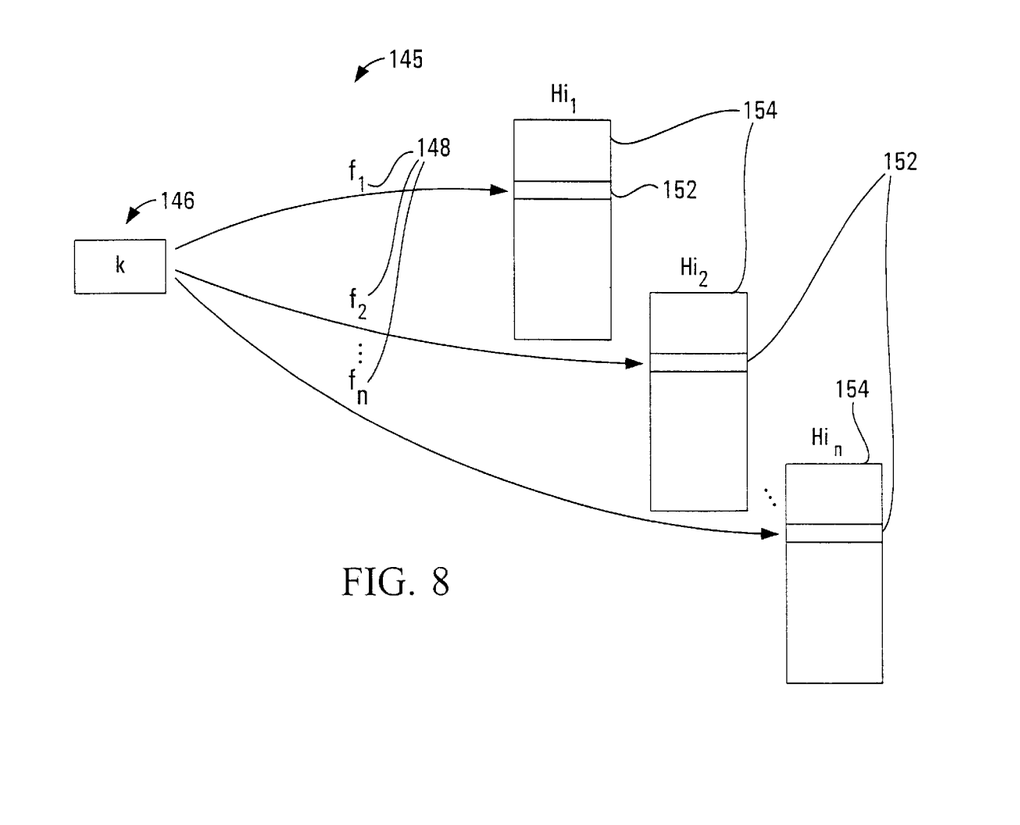
FIG. 8 is a schematic representation of the use of the hash table shown in FIG. 2, according to a second embodiment of the invention.

Referring to FIG. 8, in yet another embodiment, the multiple hash functions 148 may be applied simultaneously, using the connection information as a key 146 to index the multiple hash table entries 152. Referring back to FIG. 2 and FIG. 8, to facilitate simultaneous application of the multiple hash functions 148, the processor circuit 37 may be configured in parallel to apply the hash functions 148 simultaneously, and each hash function 148 may be assigned separate copies 154 of the hash table among the hash tables 58 stored in separate memories (not shown), so the hash table copies 154 may be accessed simultaneously.

Referring to FIGS. 6 and 7, once the hash table entries 152 corresponding to the connection information 146 are found at block 136 of FIG. 6, the processing circuit 37 is directed to block 138, where the hash table entries 152 previously identified at block 136 are examined. The connection is indicated to have been previously counted if the examined hash table entries 152 all have a particular was-counted value. In one embodiment, the hash table entries 152 are a single bit, and the entire hash table 150 may be considered a bit-vector. The particular was-counted value may be "1" in this embodiment. In an alternative embodiment, the hash table entries 152 may contain a sequence number, indicating the time period during which the connection was last counted. In this alternative embodiment, the particular was-counted value may be the current sequence number corresponding to the current measurement time period.

If the connection is determined to have been counted at block 138, then no more processing is performed on the individual packet for the purpose of counting active connections. Otherwise, the connection must be counted and processing proceeds at blocks 140 and 142. At block 140, the was-counted value is placed into the examined hash table entries 152 previously identified at block 136. Then, at block 142, a counter corresponding to the class of connections identified at block 134 is incremented. Referring to FIG. 2, this corresponding counter is among the plurality of counters 56 stored in the memory 54.

Thus, the number of active connections is counted for each class of connection during a predetermined measurement time period. When the measurement time period expires, the counters 56 are reset to zero and counting begins for a new measurement time period. A timer is used to determine when the measurement time period expires, which may be the same as the interval timer, or alternatively may be a different timer.

Referring again to FIG. 7, in one embodiment the hash table entries 152 may be single bits, and each hash table 150 corresponds to a bit-vector. In this embodiment, the bit-vector is set to zero when the counters 56 of FIG. 2 are reset in order to empty the was-counted values from the hash tables 150.

In an alternative embodiment, the hash table entries 152 may be a sequence of numbers, indicating the time period during which some connection was last counted. In this embodiment, a current sequence number is maintained in memory 54, and is incremented when the measurement time period expires. The current sequence number is used as the was-counted value at block 138 of FIG. 6. Thus, changing the was-counted value by incrementing the current sequence number effectively empties the hash tables. P. E. McKenney in "High-Speed Event Counting and Classification using a Dictionary Hash Technique," *International Conference on Parallel Processing,* 1989, pp. III-71–75 teaches how to handle overflow of the current sequence number.

Figure 9:
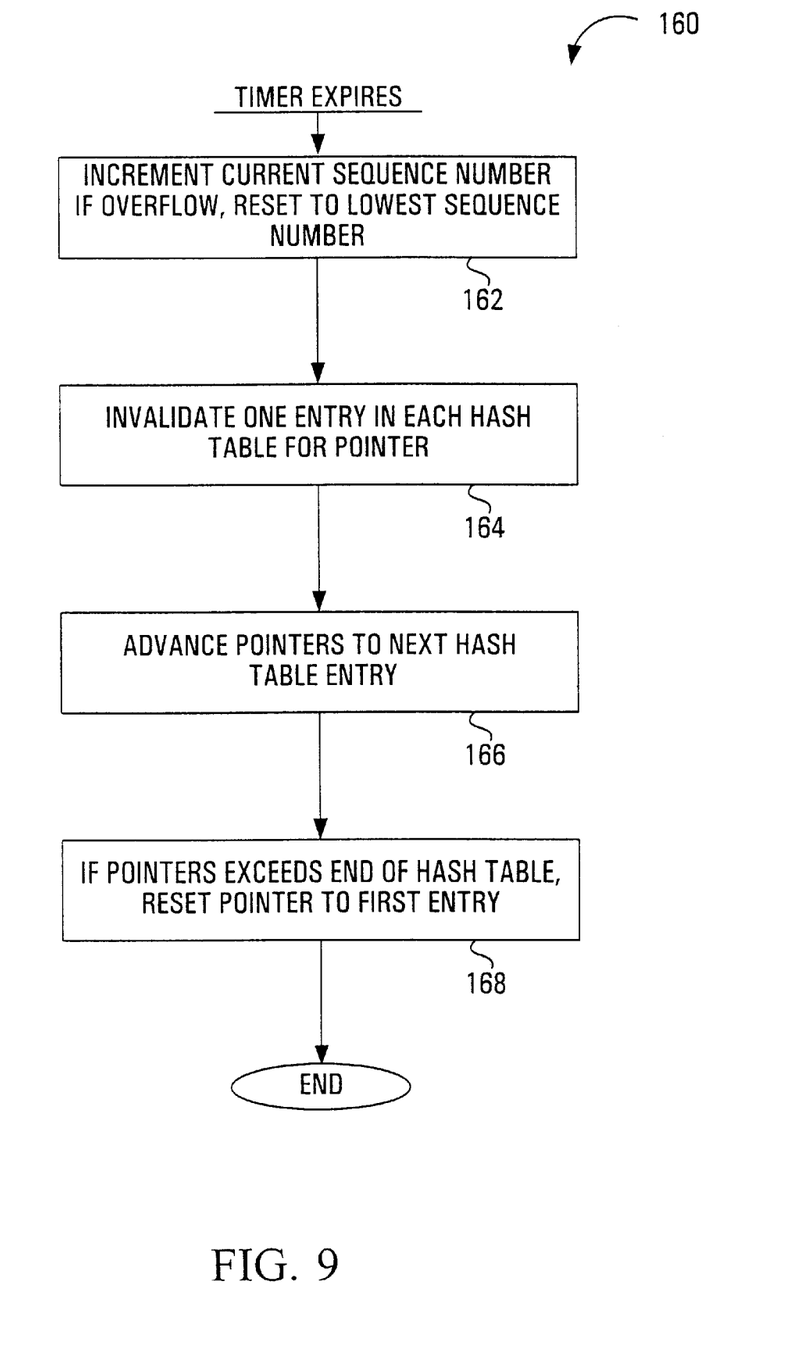
FIG. 9 is a flowchart of a hashing maintenance algorithm executed by the processor circuit shown in FIG. 2.

Referring to FIG. 9, the processor circuit 37 performs the process shown generally at 160 when the measurement time period expires. This may be invoked through an interrupt signal produced by a timer, or alternatively could be incorporated into the packet processing of FIG. 6, for example. At block 162 of FIG. 9, the current sequence number is incremented, and if it exceeds a largest possible sequence number, there is an overflow condition, and the current sequence number is reset to a smallest possible sequence number. Since the sequence numbers are thus reused, there is a possibility that the hash tables may contain a sequence number from a previous time period that is the same as the current sequence number. This would incorrectly include was-counted values in the hash tables. The remaining blocks 164, 166 and 168 of FIG. 9 address this problem.

Referring to FIGS. 7 and 9, following increment of the current sequence number at block 162, one chosen hash table entry 152 in each hash table 150 is invalidated at block 164 by setting the chosen hash table entry 152 to an invalid sequence number. The invalid sequence number is a number that does not occur as a sequence number, and cannot be mistaken as a was-counted value. The chosen hash table entry 152 is chosen by a pointer which indicates a single entry in a hash table. Thus, one sequence number is invalidated in each hash table when the timer expires. Following the invalidating of one hash table entry at block 164, the pointers are advanced at block 166 to the next entry in the hash table 150. Thus, each entry in the hash table 150 will eventually be invalidated. As long as the length of the sequence of sequence numbers is longer than the hash table, this prevents the current sequence number from appearing in any hash table entry 152 from a previous time measurement period. Following the advance of the pointer at block 166, the pointer is reset to the first entry of the hash table 150 at block 168 if advancing the pointer has exceeded the last entry in the hash table 150.

In an alternative embodiment, blocks 164, 166 and 168 may be replaced by a process that invalidates all the entries in all the hash tables when the current sequence number overflows, for example.

Thus, following the above procedure, the number of active connections is counted for each class of connections during a predetermined measurement time period, providing the values for $N_i$ and the total number of connections for all classes $$\sum_{j=1}^{K} N_j,$$

thereby permitting the calculation of the value $W_i$. It will be appreciated by those skilled in the art upon review of this specification that there are alternatives for counting the number of active connections.

As the counters do not record the number of active connections until the end of the measurement time period, it may be desirable to use the counters from the previous measurement time period to obtain the values for $N_i$ and $$\sum_{j=1}^{K} N_j.$$

This can be easily accommodated by using two sets of counters at 56 in FIG. 2, and alternating use of the two sets of counters in FIG. 6 during alternate measurement time periods. In any event, the useable values $N_i$ and $$\sum_{j=1}^{K} N_j$$

may be read at any time from the counters 56.

As the value W represents an effective window size per connection for a typical connection and the entity $$\sum_{j=1}^{K} N_j$$

represents the total number of connections in all the classes at the network node, the product of these two entities $$\left( W \cdot \sum_{j=1}^{K} N_j \right)$$

represents the total effective window value that can be shared among all of the connections.

Class Parameter

The class parameter associated with each class of connection may be received at the processor circuit 37 through the interface 43, which may facilitate reception and storage of class parameters from another computer, or an operator console, for example, for use in the above relation. In this embodiment, the class parameters are prices, but may be any parameter associated with a class of connections. Knowing the price of each of the classes of connection, a price ratio for each class of connections is calculated according to the relation:

$$\gamma_i = p_i \bigg/ \sum_{j=1}^{K} p_j, \quad i = 1, 2, \ldots, K$$

Where:

$\gamma_i$ is a price ratio used in subsequent calculations;

$P_i$ is a price associated with class i; and $$\sum_{j=1}^{K} p_j$$

is the summation is the sum of the prices $p_j$ of each class of connections.

From the foregoing, it will be appreciated how W, $N_i$, $$\sum_{j=1}^{K} N_j$$

and $\gamma_i$ are calculated and it will be appreciated that each of these values may be used in the relation below to produce a class connection-specific window value $W_i$ for use in the process shown in FIG. 4;

$$W_i = \frac{\gamma_i \cdot W \cdot \sum_{j=1}^{K} N_j}{\max(N_i, 1)}$$

Thus it will be appreciated that $W_i$ may be considered a class connection-specific volume value or indicator of a desired number of packets which can be received into the queue of the network element on active connections of a corresponding class of connections, in response to a class parameter such as $\gamma_i$ and queue conditions as represented by W, for example. This value $W_i$ is communicated to a corresponding packet source and acts as an indication of a desired number of packets to be received from the source. As a result of communicating this indication to the source, the source changes the number of packets per unit time, of class i, it transmits to the network element and thus desired packet flow from the packet source is adjusted according to the class parameter $\gamma_i$ and queue conditions at the network element.

It will be appreciated that each time an acknowledgement packet arrives at the network element, a corresponding acknowledgement packet is transmitted to the source and subject to the constraints described in connection with FIG. 4, such corresponding acknowledgement packet may include a class connection-specific volume value. As many acknowledgement packets are received by the network element on many classes of connections, many class connection-specific volume values are produced. Thus, a plurality of class connection-specific volume values representing the number of packets which can be received into the queue from active connections of respective corresponding classes of connections are produced.

While specific embodiments of the invention have been described and illustrated, such embodiments should be considered illustrative of the invention only and not as limiting the invention as construed in accordance with the accompanying claims.

What is claimed is:

1. A method of indicating desired packet flow to a network element having a queue, the method comprising:

producing a measure of queue conditions at said network element by determining a total effective window value that can be shared among all connections; and communicating to at least one packet source an indication of a desired number of packets to be received from said at least one packet source in a time period, in response to a class parameter associated with a class of connections supported by said network element and queue conditions at said network element.

2. An apparatus for indicating desired packet flow from a packet source to a network element having a queue, the apparatus comprising:
   a) a processor circuit configured to produce a measure of said queue conditions by determining a total effective window value that can be shared among all connections, and to produce a desired packet flow representation in response to a class parameter associated with a class of connections supported by the network element and queue conditions at the network element; and
   b) a desired packet flow representation signal transmitter for transmitting said desired packet flow representation to the packet source.

3. A method of indicating desired packet flow to a network element having a queue, the method comprising:
   producing a class connection-specific volume value representing the number of packets which can be received into said queue from active connections of a corresponding class associated with said class connection-specific volume value; and
   communicating to at least one packet source an indication of a desired number of packets to be received from said at least one packet source in a time period, in response to a class parameter associated with a class of connections supported by said network element and queue conditions at said network element, said class parameter representing said class connection specific volume value, wherein communicating includes transmitting an indication of desired packet volume associated with said class of connections supported by the network element.

4. The method of claim 3 wherein producing comprises producing a class connection-specific window size value $W_i$ for at least one class of connections.

5. A method of indicating desired packet flow to a network element having a queue, the method comprising:
   producing a plurality of class connection-specific volume values representing the number of packets which can be received into said queue from active connections of respective corresponding classes of connections; and
   communicating to at least one packet source an indication of a desired number of packets to be received from said at least one packet source in a time period, in response to a class parameter associated with a class of connections supported by said network element and queue conditions at said network element, said class parameter representing said class connection specific volume value, wherein communication includes transmitting an indication of desired packet volume associated with said class of connections supported by the network element.

6. The method of claim 5 wherein producing comprises producing class connection-specific window size values $W_i$ for each class of connections.

7. The method of claim 6 further comprising determining a total effective window value that can be shared among all connections and apportioning said total effective window value among said class connection-specific window size values $W_i$.

8. The method of claim 7 further comprising quantifying the number of active connections for a class of connections by counting the number of distinct connections in said class which deliver packets at said network element during a predefined measurement time period.

9. The method of claim 8 wherein counting comprises extracting connection information from an arriving packet.

10. The method of claim 9 wherein extracting comprises reading a connection identifier of said arriving packet and wherein counting comprises incrementing a value when said connection identifier is distinct during said predefined measurement time period.

11. The method of claim 7 wherein apportioning further comprises weighting said total effective window value according to respective class parameters associated with said classes of connections.

12. The method of claim 11 wherein weighting comprises weighting said total effective window value according to prices of said classes of connections.

13. The method of claim 12 wherein weighting comprises producing weights for said total effective window value, from price ratios representing the ratio of one of said prices associated with a corresponding class of connections to the sum of said prices of said classes of connections.

14. The method of claim 13 wherein communicating comprises transmitting said class connection-specific window size value for each class of connection.

15. A method of indicating desired packet flow to a network element having a queue, the method comprising:
   receiving and storing a plurality of class parameters relating to a plurality of class of connections, including receiving and storing pricing information relating to said plurality of classes of connections; and
   communicating to at least one packet source an indication of a desired number of packets to be received from said at least one packet source in a time period, in response to a class parameter associated with a class of connection supported by said network element and queue conditions at said network element.

16. The method of claim 15 wherein communicating comprises producing a representation of said desired number of packets.

17. The method of claim 16 wherein producing said representation comprises producing class connection-specific window size values $W_i$ for each class of connections, said class connection-specific window size values being weighted according to said pricing information.

18. The method of claim 17 wherein producing said class connection-specific window size values comprises producing price ratios representing the ratio of a price associated with a corresponding class of connections to the sum of a plurality of prices of said classes of connections.

19. An apparatus for indicating desired packet flow from a packet source to a network element having a queue, the apparatus comprising:
   produce a representation of a class parameter for a class of connections supported by the network element; and
   produce a desired packet flow representation in response to said class parameter and queue conditions at the network element; and
   a desired packet flow representing signal transmitter for transmitting said desired packet flow representing to the packet source.

20. The apparatus of claim 19 wherein said processor circuit is further configured to produce a class connection-specific volume value representing the number of packets which can be received into said queue from active connections of a corresponding class associated with said class connection-specific volume value.

21. The apparatus of claim 19 wherein said processor circuit is further configured to produce a class connection-specific volume value by producing a class connection-specific window size value $W_i$ for at least one class of connections.

22. The apparatus of claim 19 wherein said processor circuit is further configured to produce a plurality of class connection-specific volume values representing the number of packets which can be received into said queue from active connections of respective corresponding classes of connections and to cause each of said class connection-specific volume values to be communicated to packet sources which provide packets on corresponding classes of connections.

23. The apparatus of claim 22 wherein said processor circuit is further configured to produce a plurality of class connection-specific volume values by producing class connection-specific window size values $W_i$ for each class of connections.

24. The apparatus of claim 23 wherein said processor circuit is further configured to determine a total effective window value that can be shared among all connections and to apportion said total effective window value among class connection-specific window size values $W_i$.

25. The apparatus of claim 24 wherein said processor circuit is further configured to quantify the number of active connections for a class of connections by counting the number of distinct connections in said class which deliver packets at said network element during a predefined measurement time period.

26. The apparatus of claim 25 wherein said processor circuit is further configured to count distinct connections by extracting connection information from an arriving packet.

27. The apparatus of claim 26 wherein said processor circuit is further configured to extract connection information by reading a connection identifier of said arriving packet and incrementing a value when said connection identifier is distinct during said predefined measurement time period.

28. The apparatus of claim 24 wherein said processor circuit is further configured to apportion said total effective window value by producing parameter weighted window size values by weighting said total effective window value according to respective class parameters associated with said classes of connections.

29. The apparatus of claim 24 wherein said processor circuit is further configured to apportion said total effective window value by weighting said total effective window value according to prices of said classes of connections.

30. The apparatus of claim 24 wherein said processor circuit is further configured to weight said total effective window value according to price ratios representing the ratio of one of said prices associated with a corresponding class of connections to the sum of said prices of said classes of connections.

31. The apparatus of claim 30 wherein said representation signal transmitter is configured to transmit a class connection-specific window size value for each class of connection.

32. An apparatus for indicating desired packet flow from a packet source to a network element having a queue, the apparatus comprising:
   produce a representation of a class parameter for a class of connections supported by the network element; and
   produce a desired packet flow representation in response to class parameter and queue conditions at the network element; and
   receive and store a plurality of class parameters relating to a plurality of classes of connetions; and
   produce a desired packet flow representation in response to a class parameter associated with a class of connections supported by the network element and queue conditions at the network element; and
   a desired packet flow representation signal transmitter for transmitting said desired packet flow representation to the packet source.

33. The apparatus of claim 32 wherein said processor circuit is further configured to receive and store a plurality of class parameters by receiving and storing pricing information relating to said plurality of classes of connections.

34. The apparatus of claim 33 wherein said representation signal transmitter is further configured to transmit a representation of said desired number of packets.

35. The apparatus of claim 34 wherein said processor circuit is further configured to produce said representation by producing class connection-specific window size values $W_i$ for each class of connections, said class connection-specific window size values being weighted according to said pricing information.

36. The apparatus of claim 35 wherein said processor circuit is further configured to produce said class connection-specific window size values from price ratios representing the ratio of a price associated with a corresponding class of connections to the sum of a plurality of prices of said classes of connections.

37. The apparatus of claim 36 wherein said representation signal transmitter transmits said class connection-specific window size values in respective acknowledgement packets.

* * * * *